UNITED STATES PATENT OFFICE.

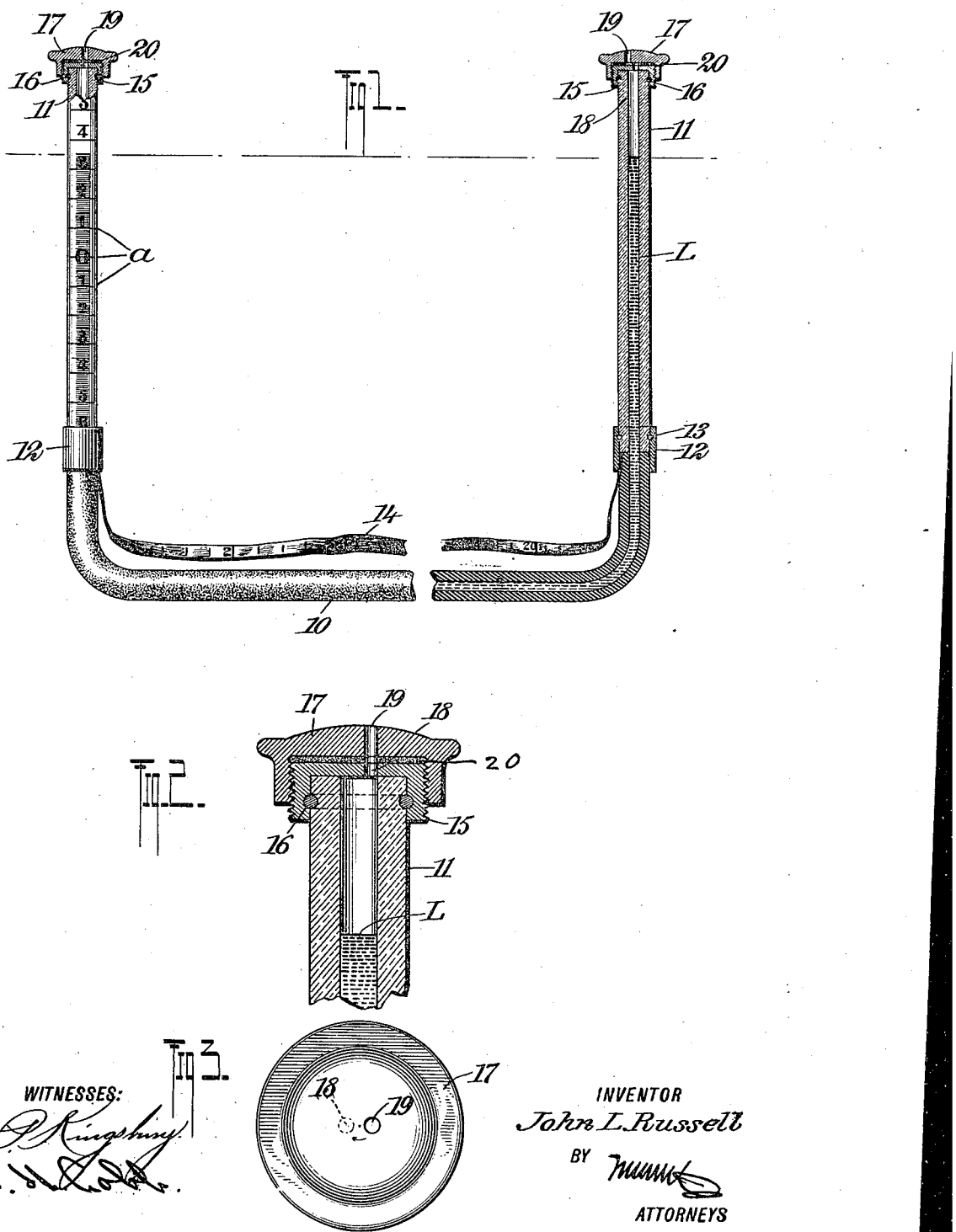

JOHN LYTLE RUSSELL, OF ANDERSONIA, CALIFORNIA.

LEVEL.

No. 825,760.  Specification of Letters Patent.  Patented July 10, 1906.

Application filed December 14, 1904. Serial No. 236,841.

*To all whom it may concern:*

Be it known that I, JOHN LYTLE RUSSELL, a citizen of the United States, and a resident of Andersonia, in the county of Mendocino and State of California, have invented a new and Improved Level, of which the following is a full, clear, and exact description.

My invention relates to levels, its principal object being to provide a simple and accurate device which will enable levels of points at considerable distances to be determined.

It consists in the various features and combinations hereinafter described and claimed.

Reference is to be had to the accompanying drawings, forming a part of this specification, in which similar characters of reference indicate corresponding parts in all the figures.

Figure 1 is a broken side elevation of one embodiment of my invention, parts being in section. Fig. 2 is an enlarged central vertical section through one end of the tube, and Fig. 3 is a top plan view thereof.

10 designates a tube formed of some such flexible material as rubber and being of such a character as to contain a liquid, which may be mercury, alcohol, or any other which is convenient. The opposite ends of the tube are provided with rigid transparent sections or terminals 11 11, preferably of glass. These terminals may be connected to the tube by encircling sleeves 12 and may be cemented in place, there being also shown packing-rings 13, resting in recesses in the sleeves, and terminals to insure a fluid-tight joint. Each of the end sections has an index-mark, this being preferably in the form of a scale *a*, the zero of which is situated midway of the section, the graduations extending therefrom in opposite directions. A flexible linear scale may also be carried by the flexible tube, extending between the end sections, as shown at 14.

After filling the level with liquid, as indicated at L, there being a sufficient amount to rise within the transparent sections, the air at each end above the surface of the liquid is preferably exhausted and a closure effected, thus preventing the escape of the contents and its evaporation. As here illustrated, the closure includes a cap 15, secured upon this outer end of each of the sections and preferably provided with a packing-ring 16, similar to that previously described. The exterior of each cap is threaded, and upon this portion operates a screw-cap 17. In the inner cap is formed an opening 18, preferably placed eccentrically thereof, while the outer cap has a similar eccentric opening 19, these openings being so related to one another that by turning the screw-cap they may be brought into alinement to permit the exhaustion of the air and then the opening 19 turned to one side to complete the closure, the integrity of which may be maintained by interposed gaskets 20.

In the use of the device one of the end sections is placed at the point to which the level is to be referred. The opposite terminal is then carried to the place at which the level is to be fixed, the length and flexibility of the tube permitting this and raised or lowered until the liquid at both ends stands at corresponding marks upon the scales. This fixes the desired level. The scale in connection with the tube may be employed in the ordinary way for measuring distances or heights.

Having thus described my invention, I claim as new and desire to secure by Letters Patent—

1. A level, comprising a flexible tube adapted to contain a liquid, transparent sections having scales thereon, sleeves securing the transparent sections to the ends of the flexible tube, and a flexible scale having its ends secured to the ends of the flexible tube by the said sleeves.

2. A level, comprising a flexible tube adapted to contain a liquid, transparent sections having scales thereon and secured to the ends of the flexible tube, each transparent section being provided with a small opening in its outer end, caps mounted to turn on the outer ends of the transparent sections and provided with openings, and a flexible scale extending between the ends of the transparent sections.

In testimony whereof I have signed my name to this specification in the presence of two subscribing witnesses.

JOHN LYTLE RUSSELL.

Witnesses:
 WILLIAM J. TURNER,
 MARK W. STONE.